US009088953B2

(12) United States Patent
Bishop et al.

(10) Patent No.: US 9,088,953 B2
(45) Date of Patent: Jul. 21, 2015

(54) METHOD, APPARATUS AND COMPUTER PROGRAM FOR LIMITING THE TOTAL TRANSMIT POWER OF A WIRELESS DEVICE

(71) Applicant: Broadcom Corporation, Irvine, CA (US)

(72) Inventors: Andrew Bishop, Surrey (GB); Alexander Graham Charles, Hampshire (GB); Stuart Ian Geary, Hampshire (GB); Sami Jutila, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 84 days.

(21) Appl. No.: 13/914,659

(22) Filed: Jun. 11, 2013

(65) Prior Publication Data

US 2014/0155119 A1    Jun. 5, 2014

(30) Foreign Application Priority Data

Jun. 11, 2012    (GB) .................................. 1210257.0

(51) Int. Cl.
*H04W 52/28* (2009.01)
*H04W 52/36* (2009.01)
*H04W 88/06* (2009.01)
*H04W 52/26* (2009.01)
*H04W 52/34* (2009.01)

(52) U.S. Cl.
CPC ............ *H04W 52/28* (2013.01); *H04W 52/367* (2013.01); *H04W 52/265* (2013.01); *H04W 52/281* (2013.01); *H04W 52/346* (2013.01); *H04W 88/06* (2013.01)

(58) Field of Classification Search
CPC ..... H04W 52/28; H04W 88/02; H04B 1/3816
USPC ......... 455/552.1, 558, 522, 550.1, 414.1, 434
See application file for complete search history.

(56) References Cited

U.S. PATENT DOCUMENTS

| 2006/0209803 | A1 | 9/2006 | Rajaniemi et al. | |
|---|---|---|---|---|
| 2006/0217153 | A1* | 9/2006 | Coles et al. .................. | 455/558 |
| 2009/0275355 | A1 | 11/2009 | Tan et al. | |
| 2010/0317403 | A1* | 12/2010 | Mizuo .......................... | 455/558 |
| 2011/0170481 | A1* | 7/2011 | Gomes et al. ................ | 370/328 |
| 2013/0042251 | A1* | 2/2013 | Nader .......................... | 718/103 |
| 2013/0150032 | A1* | 6/2013 | Pattaswamy et al. ......... | 455/434 |
| 2013/0237197 | A1* | 9/2013 | Ruvalcaba et al. ........... | 455/418 |
| 2013/0250916 | A1* | 9/2013 | Aoyagi et al. ................ | 370/331 |
| 2014/0148178 | A1* | 5/2014 | Wippich ....................... | 455/450 |

FOREIGN PATENT DOCUMENTS

EP    1524774 A1    4/2005

* cited by examiner

*Primary Examiner* — Cong Tran
(74) *Attorney, Agent, or Firm* — Oblon, McClelland, Maier & Neustadt, L.L.P.

(57) ABSTRACT

A wireless device has a plurality of radio systems. The current priority of each of the radio systems is determined. An upper bound for the transmit power of each of the radio systems is set in dependence on at least the current priorities of the radio systems and a current maximum permitted transmit power of the wireless device. The upper bounds for the transmit power of each of the radio systems are variable over time and are set such that the sum of the upper bounds does not exceed the current maximum permitted transmit power of the wireless device. For each of the radio systems, the transmit power of that radio system is limited such that the respective upper bound for the transmit power for that radio system is not exceeded.

23 Claims, 5 Drawing Sheets

METHOD, APPARATUS AND COMPUTER PROGRAM FOR LIMITING THE TOTAL TRANSMIT POWER OF A WIRELESS DEVICE

CROSS REFERENCE TO RELATED APPLICATION

This application claims the benefit under 35 U.S.C. 119(a) and 37 CFR §1.55 to UK patent application no. 1210257.0, filed on Jun. 11, 2012, the entire content of which is incorporated herein by reference.

TECHNICAL FIELD

The present invention relates to a method, apparatus and computer program for limiting the total transmit power of a wireless device.

BACKGROUND

The following abbreviations are used in the present specification:
CS circuit switched
eNB evolved Node B
GSM Global System for Mobile Communications
MAC media access control
NRT non-real-time
PS packet switched
RT real-time
SAR specific absorption rate
SIM subscriber identity module
TDMA Time Division Multiple Access
UE user equipment
WCDMA Wideband Code Division Multiple Access A multi-SIM (subscriber identity module) wireless device, including particularly mobile devices such as mobile phones (including so-called "smart phones"), personal digital assistants, tablet and laptop computers, etc., can hold two or more SIM cards. Currently, such devices can typically hold two SIM cards, though phones that can hold three SIM cards are now available and it is likely that phones and other wireless devices that can hold more SIM cards will become available. For simplicity and brevity, reference will often be made in this specification to a dual-SIM device, which can operate with two networks and/or tariff arrangements, etc., but it will be understood that much of what is described herein can be applied to a multi SIM wireless device having in principle any number of SIMs for operating with a corresponding number of networks and/or tariff arrangements, etc.

Dual-SIM operation allows the use of two services without the need to carry two devices at the same time. For example, the same handset can be used for business and private use with separate numbers and bills. As another example, both SIMs may be used with the same network operator, for example to achieve a higher total bandwidth for data connections. As yet another example, the device may contain both cellular and non-cellular radios which are used for voice and data communication respectively using the different SIMs. In any event, using multiple SIMs allows the user to take advantage of different pricing plans for calls and text messages to certain destinations as well as mobile data usage, and/or to keep personal and business use separate for example, and/or to achieve higher bandwidth, and/or to obtain coverage across different networks using a single handset. The present invention is particularly concerned with mobile wireless devices that have two (or more) SIMs and radio systems which can be used simultaneously, and thus allow for example a user to send or receive data whilst making a voice call, and/or to have plural voice calls active simultaneously, and/or to have plural data calls active simultaneously, all on the one device and using the separate radio systems. The wireless devices may have cellular radio systems, non-cellular radio systems or both.

Wireless devices typically need to adjust the transmit power of their radio system(s) depending on the surrounding radio environment. As a particular example, in Wideband Code Division Multiple Access (WCDMA), the transmit power of a radio system is updated frequently (at a rate of 1500 Hz) in order to cope with fast fading. It is important to have the transmit power of a radio system set accurately. If it is set too high, then the capacity of the cell in which the radio system is camped is reduced, and if it is set too low, then the quality of the service provided to the user is compromised.

When a wireless device is transmitting using two or more radio systems, the maximum total transmit power (in milliWatts) that may be generated by that device at any particular time is equal to the sum of the maximum transmit powers (in milliWatts say) that can be generated by each of the radio systems of the device. However, it may be that the maximum total transmit power of the device is restricted or has to be limited in some way, for example to meet legal requirements or current operating conditions of the wireless device.

US-A1-2009/0275355 discloses a multi-mode wireless device that uses first and second wireless modems which operate independently over different air interfaces. When the first wireless modem is transmitting, the maximum transmit power available to the second wireless modem is reduced. When the first wireless modem ceases transmitting, the maximum transmit power available to the second wireless modem is restored. However, this is a relatively simplistic approach to the problem of controlling the total transmit power of the device.

SUMMARY

In a first exemplary embodiment of the invention, there is a method of limiting the total transmit power of a wireless device having a plurality of radio systems that each provide service for a different SIM of the wireless device, the method comprising a processing system of the wireless device; determining the current priority of each of the radio systems; setting an upper bound for the transmit power of each of the radio systems in dependence on at least the current priorities of the radio systems and a current maximum permitted transmit power of the wireless device, the upper bounds for the transmit power of each of the radio systems being variable over time and being set such that the sum of the upper bounds does not exceed the current maximum permitted transmit power of the wireless device, the transmit power of the wireless device at any time being the sum of the transmit powers of the radio systems at that time; and, for each of the radio systems, limiting the transmit power of that radio system such that the respective upper bound for the transmit power for that radio system is not exceeded.

The processing system may comprise at least one processor and at least one memory including computer program instructions, the at least one memory and the computer program instructions being configured, with the at least one processor, to cause the wireless device at least to perform as described above.

In a second exemplary embodiment of the invention, there is apparatus for limiting the total transmit power of a wireless device, the apparatus comprising at least one processor, and at least one memory including computer program code, the at least one memory and the computer program code being configured to, with the at least one processor, cause the apparatus at least to: determine the current priority of each of plural radio systems of the wireless device, each of the radio systems providing service for a different SIM of the wireless device; set an upper bound for the transmit power of each of the radio systems in dependence on at least the current priorities of the radio systems and a current maximum permitted transmit power of the wireless device, the upper bounds for the transmit power of each of the radio systems being variable over time and being set such that the sum of the upper bounds does not exceed the current maximum permitted transmit power of the wireless device, the transmit power of the wireless device at any time being the sum of the transmit powers of the radio systems at that time; and, for each of the radio systems, limit the transmit power of that radio system such that the respective upper bound for the transmit power for that radio system is not exceeded.

In a third exemplary embodiment of the invention, there is a non-transitory computer-readable storage medium comprising a set of computer-readable instructions for limiting the total transmit power of a wireless device such that when the computer program is executed on a computing device of a wireless device having a plurality of radio systems that each provide service for a different SIM of the wireless device, the computing device is arranged to: determine the current priority of each of the radio systems; set an upper bound for the transmit power of each of the radio systems in dependence on at least the current priorities of the radio systems and a current maximum permitted transmit power of the wireless device, the upper bounds for the transmit power of each of the radio systems being variable over time and being set such that the sum of the upper bounds does not exceed the current maximum permitted transmit power of the wireless device, the transmit power of the wireless device at any time being the sum of the transmit powers of the radio systems at that time; and, for each of the radio systems, limit the transmit power of that radio system such that the respective upper bound for the transmit power for that radio system is not exceeded.

DETAILED DESCRIPTION

Figure 1:
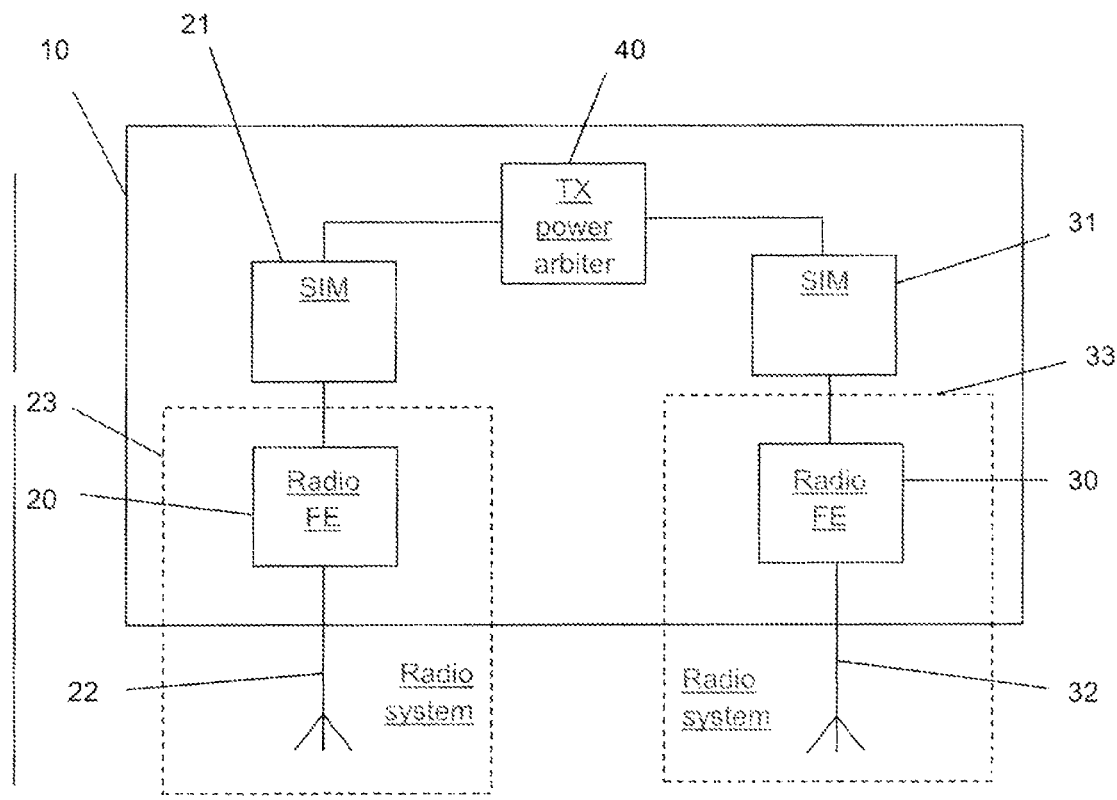
FIG. 1 shows schematically an example of a wireless device according to an embodiment of the present invention.

Limiting the transmit powers of the radio systems to their respective upper bounds thereby limits the total transmit power of the device such that the current maximum transmit power of the device cannot be exceeded. Moreover, the upper bounds on the transmit powers of the individual radio systems are set flexibly and dynamically so that, in a sense, the maximum permitted transmit power of the device as a whole can be "shared around" or distributed between the individual radio systems in a flexible and optimum manner. The processing system of the wireless device may be a specific processor dedicated to this task, or may be a processor already present in the wireless device, running appropriate software.

In an exemplary embodiment, the transmit power of each of the radio systems is limited to its respective upper bound for a predetermined limitation period, and after the predetermined limitation period has passed, the method comprises: determining a new current priority of each of said radio systems; setting a new upper bound for the transmit power of each of the radio systems in dependence on the new current priorities of the radio system and the current maximum permitted transmit power of the device; and, for each of the radio systems, limiting the transmit power of that radio system for the predetermined limitation period, such that the determined new upper bound fir the transmit power for that radio system is not exceeded within that period. Typically the priorities of the radio systems will vary over time. Reassessing the priorities of the radio systems at regular intervals allows the upper bounds on the transmit powers to be reassessed and altered if the priorities of the radio systems have changed.

In an exemplary embodiment, the average transmit power of the device, averaged over a predetermined period of time, cannot exceed a predetermined power, and the method comprises determining the current maximum permitted transmit power of the device at the start of each limitation period in dependence upon said predetermined power and the previous transmit power of the device. Monitoring the previously used transmit power and determining the current maximum permitted transmit power of the device for a particular limitation period in dependence upon this allows upper bounds on the transmit powers of the radio systems to be dynamically adjusted such that the average transmit power of the device does not exceed the predetermined power.

In an exemplary embodiment, the current maximum permitted transmit power of the device is fixed and cannot exceed a predetermined power at any time. This predetermined power may be stored in a memory of the device. Such a constant maximum permitted transmit power may be due to the maximum electrical current that can be generated and/or withstood by the device. As a particular example, if the device is powered by a battery, it may be that the battery cannot generate an electrical current above a certain threshold at any time. Thus, the electrical current required by the radio systems needs to be limited. The electrical current required by the radio systems is dependent upon the transmit power used by those radio systems and thus the electrical current required by the radio systems can be limited by limiting the transmit powers of those radio systems.

In an exemplary embodiment, the priority of each radio system is determined according to at least one of: whether the radio system is supporting circuit switched or packet switched services; whether the radio system is supporting real-time or non-real-time services; a pre-defined priority of the SIM for which the radio system provides service (this may be specified by a user of the device); quality of service requirements of the service supported by the radio system; and the priority of the service supported by the radio system (for example, calls to the emergency services may be classed as higher priority than other services).

In an exemplary embodiment, a radio system providing a circuit switched service is determined to have a higher priority than a radio system providing a packet switched service. In general, circuit switched services may be taken to include CS+PS calls (multiRAB calls), whereas PS calls may be taken to be PS calls only.

In an exemplary embodiment, a radio system providing a real-time service is determined to have higher priority than a radio system providing a non-real-time service.

In an exemplary embodiment, in the event that a first radio system is determined to have a higher priority than a second radio system, then the upper bound on the transmit power of the first radio system is set to be higher than the upper bound on the transmit power of the second radio system. The higher the upper bound on the transmit power of a particular radio system, the more likely it is that the radio system will be able to transmit at a transmit power suitable for its surrounding radio conditions. Thus, setting the upper bound on the transmit power of the higher priority radio system higher than the upper bound on the transmit power of the lower priority radio system prioritizes the transmit power requirements of a higher priority radio system over the transmit power requirements of a lower priority radio system.

In an exemplary embodiment, the setting of the upper bounds on the transmit powers of the radio systems is also dependent upon the mean current powers of the radio systems, the mean current power of a radio system being the average transmit power that would have been used by that radio system over a period of time immediately preceding the current time if the transmit power of that radio system had not been limited. The mean current power of a radio system can, in some cases, be used to come up with a reliable estimate of the transmit power that that radio system will use during the next limitation period.

In an exemplary embodiment, in the event that it is determined that one radio system has the highest priority, the upper bound on the transmit power of that radio system is set to be the lowest value out of: (i) the current maximum permitted transmit power of the device less a predetermined minimum back-off, and (ii) the sum of the mean current power of that radio system and a headroom, wherein the headroom is determined according to the predicted power variation of that radio system over the period of time for which the upper bound will be applied.

In an exemplary embodiment, the current maximum permitted transmit power is determined in dependence upon at least one of: the current temperature of the device; the maximum electrical current that can be drawn from a battery of the device; legal limitations on the transmit power of the device; and the current status of a battery of the device. This may allow, for example, the temperature of the device to be reduced by decreasing the maximum permitted transmit power. As another example, it may allow the rate of consumption of battery power of the device to be reduced by reducing the maximum permitted transmit power of the device. As a further example, it may prevent the radio systems requiring a current that is above the maximum electrical current that can be drawn from a battery of the device. As a final example, it may prevent the device from transmitting at a power that is not allowed by law.

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is often used to refer to wireless devices in general, and particularly mobile wireless devices. In general, embodiments of the present invention may be employed in general in any wireless device. The terms "transmitter" and "receiver" are also used herein and are to be construed broadly to include the whole of a device that is transmitting/receiving wireless signals as well as only particular components of a device that are concerned with transmitting/receiving wireless signals.

It is mentioned here that there are proposals to replace SIM (subscriber identity module) cards with SIM functionality provided by software in wireless devices. Reference will be made in this specification generally to "SIM" to mean that part of a device that provides for the subscriber identity module functionality whether provided by a physical card, software elsewhere in the device, or any other suitable arrangement and includes for example the protocol software and hardware running in the context of each SIM and not necessarily a physical SIM card itself. In particular, in the following description, a SIM 21,31 will be taken to include at least the relevant processing circuitry and software for that particular SIM channel (i.e. the hardware, software and/or firmware providing service in the device 10 for that particular SIM 21,31)

For simplicity and brevity, reference will often be made in this specification to a dual-SIM device, which comprises two radio systems and can operate with two networks and/or tariff arrangements, etc. simultaneously, but it will be understood that much of what is described herein can be applied to a multi SIM, multi radio system wireless device having in principle any number of SIMs and any number of radio systems for operating with a corresponding number of networks and/or tariff arrangements, etc.

FIG. 1 shows a schematic block diagram of an example of a dual-SIM wireless device 10 according to an embodiment of the present invention. The wireless device 10 has a radio front end 20,30 for each of two SIMs 21,31. Each radio front end 20,30 has its own respective antenna or set of antennas 22,32. Each radio front end 20,30 receives and transmits signals for the SIM channels corresponding to the respective SIMs 21,31. In general, the radio front ends 20,30 may provide the physical layer, baseband, MAC (media access control) and link layer control for the two SIM channels and other circuitry (not shown) may host the application layers of the device 10. Other arrangements are possible, such as the radio front ends 20,30 providing the physical layer and baseband control and other circuitry or some other common part providing MAC and link layer control. As another alternative, there may be a common baseband block for both radio front ends 20,30. It will be understood that the radio front ends 20,30 and the circuitry may in practice be implemented by one or more silicon chips or chipsets. The control may be typically as a software implementation, though a hardware or combination of software and hardware implementation is also possible. The term "radio system" 23,33 will typically be used in this specification to refer to the radio front end and antenna(s), with the relevant processing circuitry and software for a particular SIM channel (i.e. the hardware, software and/or firmware providing service in the device 10 for a particular SIM 21,31) being provided by the SIM of that SIM channel, as mentioned above. In at least some circumstances, the term "radio system" 23,33 is used to refer to all of the components for a particular SIM channel in the device 10.

In general, the maximum total transmit power of the device 10 is restricted or has to be limited in view of one or more requirements or factors. For example, due to legal limitations on the specific absorption rate (SAR) of the device, the device 10 may only be permitted to transmit at a total transmit power up to a certain maximum permitted transmit power. The SAR of a device is the rate of absorption of RF energy generated by the device, per kilogram of the human body. The SAR of a device varies depending on the position of the human body at which it is measured. For mobile phones, it is typically measured near the head and at other body parts, such as the torso. Legally, the average SAR of a device is not allowed to exceed a certain limit over a pre-specified period of time, and thus this imposes an upper limit on the transmit power of the device. In Europe, for example, the SAR is the rate of absorption of RF energy generated by the device per kilogram of the human body averaged over 6 minutes. As another example, in the USA, the SAR is the rate of absorption of RF energy generated by the device per kilogram of the human body averaged over 30 minutes.

As another example, the total transmit power of the device 10 may be limited by the maximum electrical current that the device 10 can generate/withstand. As a further example, the total transmit power of the device 10 may be limited by the maximum thermal heating that the device can withstand. It is therefore important to control the transmit powers of the individual radio systems so that the maximum total transmit power of the device 10 is not exceeded. It should be noted that the permitted maximum total transmit power of the device 10 may vary over time, depending on, for example, the transmit power that has already been used by the device 10 or on other recent operating conditions for the device 10.

In an embodiment of the invention, the device 10 has a current maximum permitted transmit power and the total transmit power of the device 10 (i.e. the total actual transmit power at any particular instant of time) is limited to the current maximum permitted transmit power by setting upper bounds on the transmit powers of the radio systems 23,33. In this case, the upper bounds on the transmit powers of the radio systems are determined according to the current priorities of the radio systems 23,33. The upper bounds are set such that the sum of the upper bounds on the transmit powers of the radio systems 23,33 does not exceed the current maximum permitted transmit power of the device 10. In this way, the current maximum transmit power of the device cannot be exceeded. Moreover, the upper bounds on the transmit powers of the individual radio systems 23,33 are set flexibly and dynamically so that, in a sense, the maximum permitted transmit power of the device 10 as a whole can be "shared around" or distributed between the individual radio systems 23,33 in a flexible and optimum manner.

As mentioned above, radio systems 23,33 typically need to adjust their transmit powers in dependence upon the surrounding radio conditions. For example, if a radio system 23,33 is transmitting to a base station that is nearby, it is likely that the radio system 23,33 will only need to use a relatively low transmit power. On the other hand, if a radio system 23,33 is near a cell edge and is attempting to transmit to a distant base station, the radio system 23,33 may need to use a higher transmit power. (These transmit powers according to distance to a base station are typically set by the base station and sent in commands to the wireless devices in cellular systems.) Setting an upper bound on the transmit power of a radio system 23,33 can, therefore, compromise the quality of service supplied to the user via that radio system 23,33. As a particular example, if a particular radio system 23,33 is being used for a CS service such as a voice call, limiting the transmit power to a power that is lower than the power that is ideally required for the surrounding radio conditions can cause the audio to be distorted, or could cause the call to be dropped. As another example, if the radio system 23,33 is being used for a PS service, limiting the transmit power of that radio system to a power that is lower than the power required for the surrounding radio conditions 23,33 can compromise the uplink data rate given that, in general, a higher transmit power is ideally used when transmitting at high data rates. Determining the priorities of the radio systems 23,33 allows the upper bounds on the transmit powers of the radio systems 23,33 to be set such that transmit power requirements of a higher priority radio system are prioritized over the transmit power requirements of a lower priority radio system 23,33.

According to one embodiment of the invention, the device 10 comprises a transmit power arbiter 40, which is configured to determine the priorities of the two radio systems 23,33 and then to determine upper bounds on the transmit powers of each of the radio systems 23,33 in dependence upon those priorities. The transmit power arbiter 40 may be provided, for example, by dedicated hardware, such as a dedicated processor optionally running dedicated software, and/or by dedicated software running on an existing processor of the wireless device 10.

In one example, the arbiter 40 determines the current priorities of the radio systems 23,33 according to one or more criteria. These criteria may be regarded as "connection parameters" that relate to the connections being provided by the radio systems 23,33 at that time, which help the arbiter 40 to determine the priorities of the radio systems 23,33. The criteria may include, for example: whether the radio systems 23,33 are supporting circuit switched (CS) or packet switched (PS) services; whether the radio systems 23,33 are supporting real-time (RT) or non-real-time (NRT) services; pre-defined priorities of the SIMs 21,31 for which the radio systems 23,33 are providing service (these priorities may be pre-specified by the user of the device. For example, a user may have a SIM for work calls and a SIM for personal calls, and the user may specify to the arbiter 40 that the work SIM is higher priority); the quality of service requirements of the services currently being supported by the radio systems 23,33 (for example some NRT applications may have different priorities relative to each other); and the priorities of the services currently being supported by the radio systems 23,33 (for example, services such as calls to the emergency services may be given higher priority).

In the case that a user is able to specify a preference for one or more SIMs 21,31 of the device 10, the device 10 may have a user interface (not shown), such as a keypad, a graphical user interface, a voice recognition interface, etc., through which the user is able to specify their preferences to the arbiter 40.

Once the arbiter 40 has determined the current priorities of the two radio systems 23,33, the arbiter 40 then sets upper bounds on the transmit powers of each of the radio systems 23,33. The arbiter 40 determines the respective upper bounds which should be set at least in dependence upon the priorities of the radio systems 23,33 and the current maximum permitted transmit power of the device 10. In the case that the current maximum permitted transmit power of the device 10 is a static predetermined current maximum permitted transmit power at all times, this power may be stored in a memory of the device 10. Thus, in this case, the arbiter 40 looks up the current maximum permitted transmit power from the memory and sets the upper bounds on the transmit power of the two radio systems 23,33, taking into account the priorities of the radio systems 23,33 and this maximum permitted transmit power. Alternatively, in the case that the current maximum permitted transmit power of the device is variable, the arbiter 40 first determines the current maximum permitted transmit power of the device and then sets the upper bounds on the transmit power of the radio systems 23,33 in dependence upon the current maximum permitted transmit power of the device 10 and the current priorities of the radio systems 23,33.

In one embodiment, once the arbiter 40 has determined the upper bounds on the transmit powers of the radio systems 23,33 that should be set, the arbiter 40 indicates the upper bound for each radio system 23,33 to the respective SIM 21,31 for which the radio system 23,33 provides service, and the respective SIM 21,31 in turn indicates the respective upper bound to the radio system 23,33 that provides service for that SIM 21,31 (or equivalently, the arbiter 40 indicates the upper bound for each radio system 23,33 to the respective radio systems 23,33 directly). Each radio system 23,33 then begins transmitting with a transmit power less than or equal to the upper bound on the transmit power that has been set for that radio system 23,33.

In one embodiment, the arbiter 40 is configured to limit the transmit powers of the radio systems 23,33 to the determined upper bounds for a predetermined limitation period ($T_{lim}$) and then, after this limitation period has expired, the arbiter 40 is configured to reassess the upper bounds on the transmit powers of the radio systems 23,33 and set new upper bounds on the transmit powers of the radio systems 23,33 for the next limitation period. This is repeated by the arbiter 40 so that the upper bounds are reassessed periodically, after every limitation period. The arbiter 40 may itself determine when the limitation period has expired. Alternatively or additionally, the SIMS 21,31 of the device 10 may send upper bound update requests to the arbiter 40, which trigger the arbiter 40 to reassess the upper bounds. These requests may be sent periodically. The requests may include parameters relating to the radio systems 23,33, including in particular connection parameters that relate to the connections being provided by the radio systems 23,33 at that time, which help the arbiter 40 to determine the priorities of the radio systems 23,33, and/or other parameters that help the arbiter 40 determine the upper bounds that should be assigned to the transmit powers of the individual radio systems 23,33.

As an example, after a limitation period has expired, the arbiter 40 may be configured to reassess the upper bounds on the transmit powers of the radio systems 23,33 by first determining the new current priorities of the radio systems 23,33. In the case that the maximum permitted transmit power of the device 10 is variable, the current maximum permitted transmit power may also be determined at this stage. Alternatively, if the current maximum transmit power is a static value stored in a memory of the device 10, it may be looked up by the arbiter 40.

In one example, the current priorities of the radio systems 23,33 and the current maximum permitted transmit power of the device 10 may be the same as they were at the start of the most recent limitation period (particularly if the radio systems 23,33 are still supporting the same services, and the maximum permitted transmit power of the device is constant), and in this case the arbiter 40 need not re-determine the upper bounds on the transmit powers of the radio systems 23,33, but may use the same upper bounds as were used in the previous limitation period.

Alternatively, if the priorities of the radio systems 23,33 and/or the current maximum permitted transmit power of the device 10 have changed, then the arbiter 40 sets new upper bounds on the transmit powers of the two radio systems 23,33 at least in dependence upon the newly determined priorities of the radio systems 23,33 and the newly determined current maximum permitted transmit power of the device 10. In this way, the upper bounds on the transmit powers are periodically adjusted to take account of any changing priorities of the radio systems 23,33 and any change to the maximum permitted transmit power of the device 10.

Periodically adjusting the upper bounds also means that if, for example, the upper bound on a high-priority radio system 23,33 is set so low during one limitation period that the base station to which the radio system 23,33 is transmitting cannot detect the signal transmitted by the radio system 23,33 (which in general may result in the base station dropping the connection), the arbiter 40 can increase the upper bound on the transmit power of that high priority radio system 23,33 in the next limitation period, thereby enabling the radio system to continue transmitting to the base station. In one example, the limitation period $T_{lim}$ is short enough that the high priority radio system 23,33 will not lose synchronization with a base station with which it is communicating if the upper bound on the transmit power is set too low in a particular limitation period. On the other hand, the limitation period $T_{lim}$ is preferably long enough so as not to add stringent real-time requirements to the device 10. As an example, the limitation period may be around 1 second or less.

It will be noted that, in addition to the current priorities of the radio systems and the current maximum permitted transmit power of the device 10, the upper bounds on the transmit powers of the radio systems may be determined according to additional criteria, examples of which will be discussed in more detail with reference to further specific examples below.

In general, in "CS" or circuit switched connections, the connection is dedicated to this call, and normally this is a voice call. In "IPS" or packet switched connections, packets of data are queued up to use the connection which may be shared. "RT" is used as an abbreviation for real-time. A voice call is real-time. An example of an RT PS service would be audio for VoIP (voice-over-Internet Protocol) or video streaming using a service such as Skype™. Correspondingly. "NRT" is used for non-real-time. An example of an NRT PS service would be synchronizing email. A CS connection is considered always to be real-time or RT.

As an exemplary embodiment of the present invention, the arbiter 40 is configured to limit the total transmit power of the device 10 to a predetermined maximum permitted transmit power that is constant at all times. As mentioned above, such a constant maximum permitted transmit power may be due to the maximum electrical current that can be generated and/or withstood by the device 10. For example, if the device 10 is powered by a battery, it may be that the battery cannot generate an electrical current above a certain threshold at any time. Thus, the electrical current required by the radio systems 23,33 needs to be limited. The electrical current required by the radio systems 23,33 is dependent upon the transmit power used by those radio systems 23,33 and thus the electrical current required by the radio systems 23,33 can be limited by limiting the transmit powers of those radio systems 23,33. The arbiter 40 is also configured to determine the priorities of the radio systems 23,33 in dependence upon whether the radio systems 23,33 are supporting CS services or PS services, and whether the services are RT or NRT. In this particular example, the arbiter 40 is configured to determine the priorities of the radio systems 23,33 at regular intervals of length $T_{lim}$. In one example, as explained above, the arbiter 40 may itself determine when it needs to reassess the upper bounds. Alternatively or additionally, the SIMs 21,31 may send upper bound update requests to the arbiter 40 at regular intervals of $T_{lim}$ which may prompt the arbiter 40 to reassess the upper bounds. (It is recalled that "SIM" is used herein to mean that part of a device 10 that provides for the subscriber identity module functionality whether provided by a physical card, software elsewhere in the device, or any other suitable arrangement, and includes for example the protocol software and hardware running in the context of each SIM and not necessarily a physical SIM card itself.)

In a particular example, the arbiter 40 classes all CS services as RT, and also classes CS+PS (multi-radio access bearer) services as CS services. In this case, the first SIM 21 indicates to the arbiter 40 whether the radio system 23 is supporting a CS service or a PS service, and, if the radio system 23 is supporting a PS service, it also indicates whether the service is RT or NRT. The second SIM 31 similarly indicates to the arbiter 40 whether the radio system 33 is supporting a CS service or a PS service, and, again, if the radio system 33 is supporting a PS service, it indicates whether the service is RT or NRT. In this example, the arbiter 40 is configured to determine that CS services are higher priority than all PS services, and that RT PS services are higher priority than NRT PS services. The arbiter 40, therefore, determines that a radio system 23,33 supporting CS services is a higher priority than a radio system 23,33 supporting PS services, and a radio system 23,33 supporting RT PS services is a higher priority than a radio system 23,33 supporting NRT PS services. In this example, it is assumed that if both radio systems 23,33 are supporting CS services, then one of these services will be on hold, and would thus be using discontinuous transmission and/or a lower data rate voice codec (both of which require relatively low transmission powers). Thus, in one example, the SIMs 21,31 are also configured to indicate to the arbiter 40 whether their respective radio system 23,33 is on hold, and the arbiter 40 is configured to determine that the radio system 23,33 that is on hold is of lower priority than the radio system 23,33 that is not on hold. If both radio systems 23,33 are supporting the same non-CS service (i.e. they are both supporting RT PS services, or are both supporting NRT PS services), then they are determined to have equal priorities.

There are a number of different methods by which the levels of the upper bounds that need to be set can be determined. Three exemplary methods are explained in the following description, and examples of when these methods may be used are summarized in the table below:

| Service supported by first radio system 23 | Service supported by second radio system 33 | High priority radio system? | Method |
|---|---|---|---|
| CS | CS | Radio system not on hold has priority | 1 |
| CS | PS RT | First radio system 23 | 1 |
| CS | PS NRT | First radio system 23 | 1 |
| PS RT | CS | Second radio system 33 | 1 |
| PS RT | PS RT | Equal priority | 3 |
| PS RT | PS NRT | First radio system 23 | 2 |
| PS NRT | CS | Second radio system 33 | 1 |
| PS NRT | PS RT | Second radio system 33 | 2 |
| PS NRT | PS NRT | Equal priority | 3 |

The following terms are used throughout the following description:

Total_max_power (dBm)=the current maximum permitted transmit power of the device (this would be equivalent to the current maximum transmit power of a radio system of a device that is transmitting using just that one radio system)

Priority_SIM_backoff (dB)=a predetermined minimum back-off from the total_max_power for the priority radio system. This could be, for example, around 1 dB Priority_SIM_headroom (dB)=an estimate of the amount by which the transmit power of the high priority radio system is likely to increase during the next limitation period $T_{lim}$. This could be, for example, around 12 dB relative to the mean_current_power of the high priority radio system (see below)

Priority_SIM_absolute_max_power (dBm)=10 $\log_{10}$ (total_max_power_lin−priority_SIM_backoff_lin)

Priority_SIM_max_power_grant (dBm)=the upper bound on the transmit power of the high priority radio system Second_SIM_max_power_grant (dBm)=the upper hound on the transmit power of the lower priority radio system Priority_SIM_mean_current_power (dBm)=the average power that was used by the high priority radio system over a period of time immediately preceding the current time Second_SIM_mean_current_power (dBm)=the average power that was used by the lower priority radio system over a period of time immediately preceding the current time $T_{lim}$(s)=the duration of the limitation period It will be noted that all of the absolute powers given above are in units of dBm which is the power ratio in decibels (dB) relative to one milliWatt. However it will be necessary at times to talk about powers in linear units (such as milliWatts). For clarity, any term used in this specification followed by "lin" will correspond to a power in linear units, such as milliWatts, rather than dBm. It will be understood that powers in milliWatts can be written in terms of a power in dBm using "power"_lin=10^("power" (in dBm)/10). For example, in the above, total_max_power_lin can be written as 10^(total_max_power/10).

Figure 2:
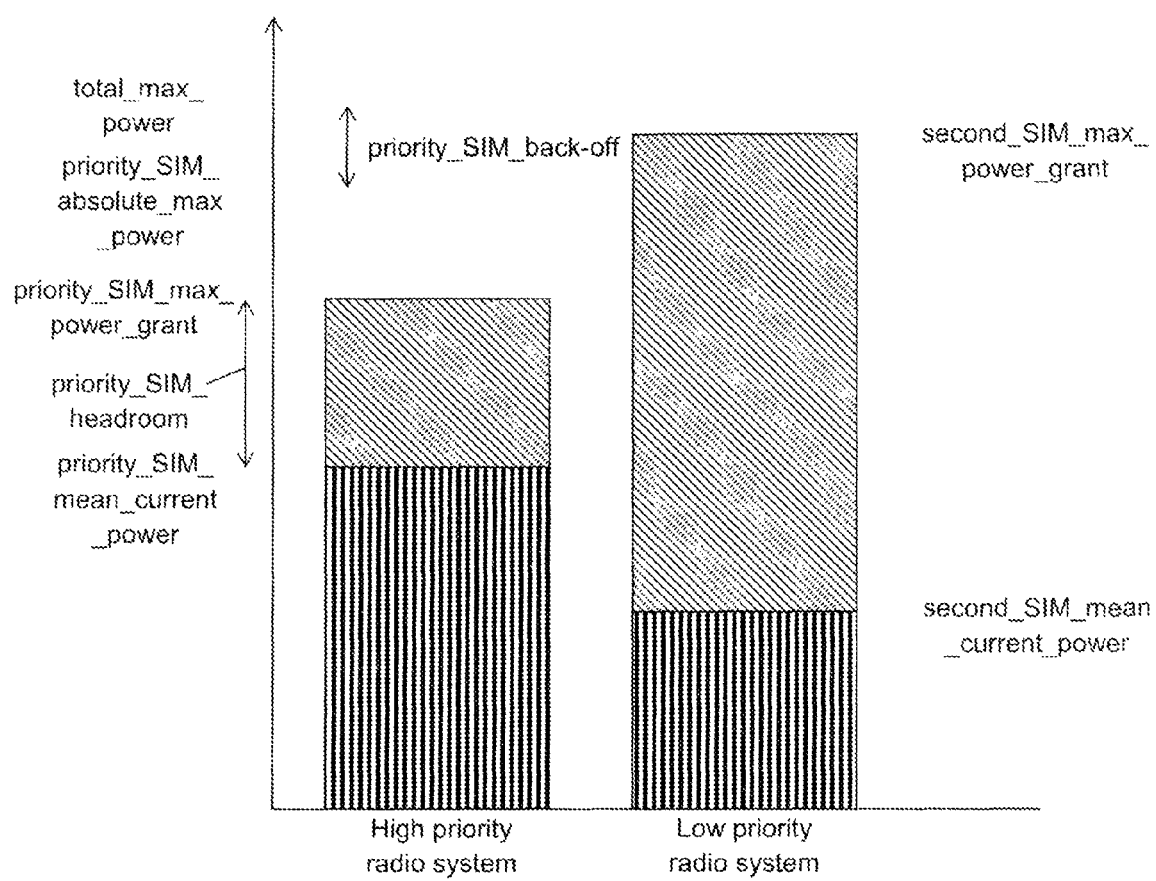
FIG. 2 shows graphically an example of how the upper bounds on the transmit powers of the radio systems may be set according to an embodiment of the present invention.
Figure 3:
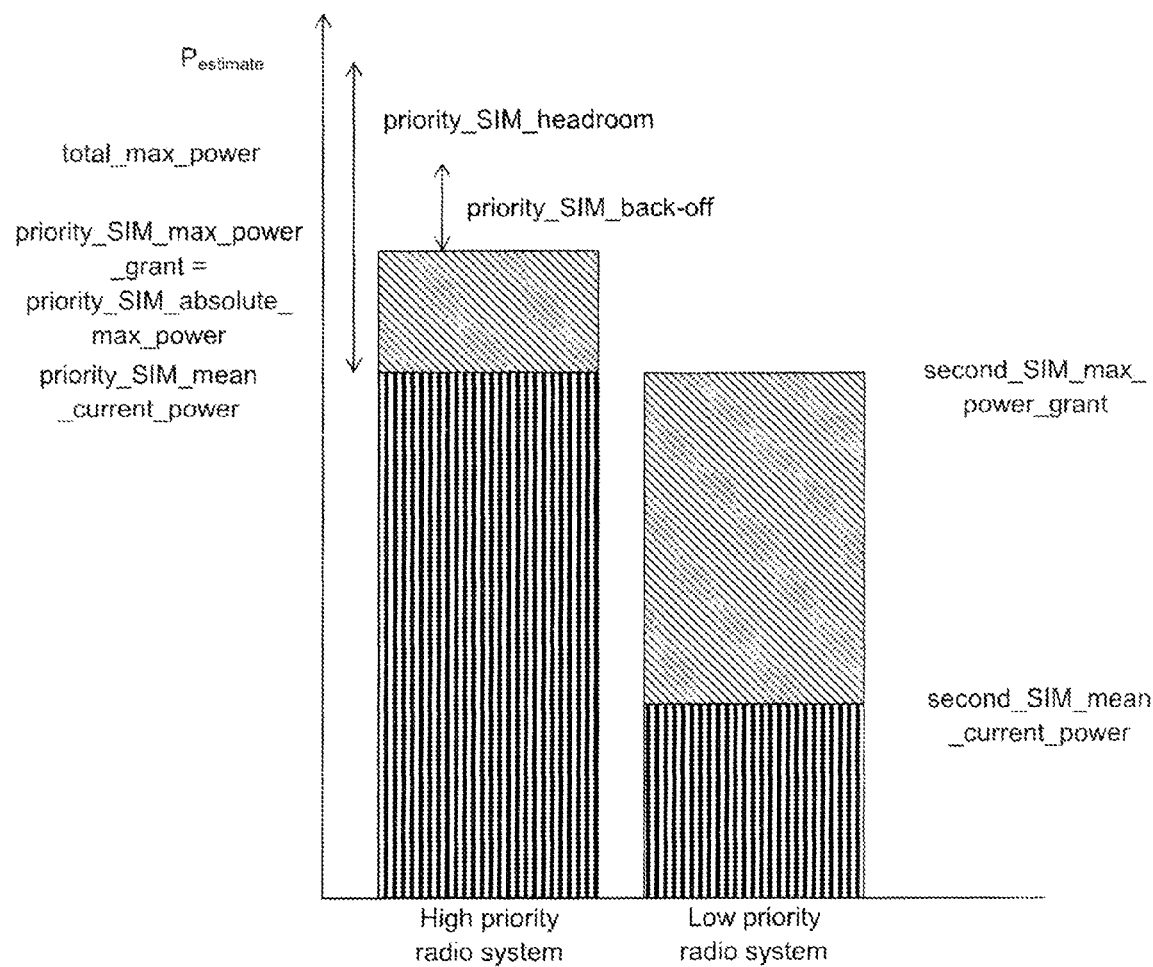
FIG. 3 shows graphically another example of how the upper bounds on the transmit powers of the radio systems may be set according to an embodiment of the present invention.

FIGS. 2 and 3 correspond to method 1 which, in this example, is applied in the case that at least one of the radio systems 23,33 is supporting a CS service. FIG. 2 shows graphically an example of how the upper bounds on the transmit powers may be set by the arbiter 40 in this example. (It should be noted that the figure and the other similar figures use a logarithmic scale.) In this case, in addition to connection parameters indicative of the priorities of the radio systems 23,33 (i.e. at least whether the connection is a CS or PS call and is RT or NRT for PS calls), the SIMS 21,31 each communicate the mean current power of their respective radio system 23,33 (priority_SIM_mean_current_power, second_SIM_mean_current_power). The mean current power (priority_SIM_mean_current_power, second_SIM_mean_current_power) of a radio system 23,33 here is the average transmit power that was used by that radio system 23,33 over a period of time immediately preceding the current time.

After the mean current power of the high priority radio system 23 (priority_SM_mean_current_power) and the mean current power of the low priority radio system 33 (second_SIM_mean_current_power) have been communicated to the arbiter 40, the arbiter 40 then calculates the "headroom" for the high priority radio system 23 that is supporting the CS service. This is an estimate of the amount by which the transmit power of the high priority radio system 23 is likely to vary, based on the typical rate of change of transmit power of that radio system 23 when supporting a CS service, and the duration of the limitation period $T_{lim}$. In one particular example, the headroom assigned to the high priority radio system 23 may be dynamic, and may be determined by the arbiter 40 at the start of each limitation period. For example, the arbiter 40 may monitor the transmit power used by the high priority radio system 23 and may determine the headroom for a particular limitation period based on the amount by which the transmit power of that radio system 23 has varied during previous limitation periods. If the transmit power of the high priority radio system 23 shows little variation, the arbiter 40 may assign that radio system 23 a relatively small headroom. Whereas, if the transmit power of the high priority radio system 23 shows a relatively large variation the arbiter 40 may assign the high priority radio system 23 a larger headroom. The transmit power of the high priority radio system 23 may vary widely over a few limitation periods, for example, if the device 10 is experiencing a large amount of fading or, as another example, if the device 10 is moving through a built up area (where buildings may get in the way of the transmitted signal). In another example, the headroom is a fixed predetermined value that is stored in a memory of the device 10, and the arbiter 40 looks up this value from the memory. The arbiter 40 is thus able to estimate the maximum transmit power ($P_{estimate}$) that will be required by the high priority radio system 23 during the next limitation period.

In this example, the arbiter 40 also determines a maximum permitted transmit power that can be assigned to the high priority radio system 23 (priority_SIM_absolute_max_power), which is determined to be the maximum permitted transmit power of the device 10 (total_max_power) minus a predetermined back-off (priority_SIM_back-off). The predetermined back-off is, in one example, looked up in a memory of the device 10 by the arbiter 40. As an example, the back-off for the high priority radio system may be set at around 1 dB (relative to the total_max_power). Setting a predetermined back-off for the high priority radio system ensures that there is always at least a small amount of transmit power available for the lower priority radio systems 23,33 to use.

Once the arbiter 40 has determined $P_{estimate}$ and priority_SIM_absolute_max_power, the arbiter 40 is configured to set the upper bound on the transmit power of the high priority radio system 23 (priority_SIM_max_power_grant) as the lowest value out of $P_{estimate}$ and priority_SIM_absolute_max_ power. In the example shown in FIG. 2. $P_{estimate}$ is less than priority_SIM_absolute_max_power. In this case, therefore, the upper bound on the transmit power of the first radio system 23 is determined to be $P_{estimate}$. FIG. 3 shows an alternative example in which $P_{estimate}$ is greater than priority_SIM_absolute_max_power. In this case, the arbiter 40 determines to set priority_SIM_max_power_grant=priority_SIM_absolute_max_power In each case, after the arbiter 40 has determined the upper bound on the transmit power of the high priority radio system 23, it then sets the upper bound second_SIM_max_power_grant on the low priority radio system 33. As an example, this may be set according to Equation 1 below:

$$\text{second\_SIM\_max\_power\_grant}=10 \log(\text{total\_max\_power\_lin}-\text{priority\_SIM\_max\_power\_grant\_lin}) \quad \text{Eqn. 1}$$

where total_max_power_lin=10^(total_max_power/10) and priority_SIM_max_power_grant_lin=10^(priority_SIM_max_power_grant/10). In this method, therefore, if the mean current power of the high priority radio system 23,33 is high (i.e. relatively close to total_max_power), then the high priority radio system 23,33 will be allocated a larger proportion of the available transmit power than the lower priority radio system 23,33. Furthermore, if the mean current power of the high priority radio system (priority_SIM_mean_current_power) is very high, such as very close to the maximum permitted transmit power of the device (total_max_power) (within a few dB of the total_max_power, for example), then in one embodiment, the upper bound on the transmit power of the high priority radio system 23,33 (priority_SIM_max_power_grant) is set equal or very close to total_max_power, and the upper bound on the transmit power of the lower priority radio system 23,33 (second_SIM_max_power_grant) is set at or close to zero. In other words, in this case, the priority_SIM_absolute_max_power is increased (or ignored) and the lower priority radio system 23,33 is not allowed to transmit, or can only transmit at a very low power.

Method 1 is also applied, in an example, when both radio systems 23,33 are supporting CS services, but one of the radio systems (the second radio system 33 say) is on hold. In this case, the SIMs 21,31 to which the radio systems 23,33 are connected indicate to the arbiter 40 that the radio systems are supporting CS services, and they also indicate whether the radio systems 23,33 are on hold. (The SIMs 21,31 may be configured to indicate whether the radio systems 23,33 to which they are connected are on hold whenever the radio system is supporting a CS service, regardless of whether the other radio system(s) of the device 10 is also supporting a CS service.) The arbiter 40 determines that the radio system 23 that is not on hold is of higher priority than the other radio system 33 which is on hold. As the high priority radio system 23 is again supporting a CS service, the arbiter 40 is again able to estimate the headroom needed for the first radio system 23 during the next limitation period, and is thus able to set the upper bound on the high priority radio system 23 in dependence upon an estimate $P_{estimate}$ of the maximum transmit power that will be needed by the high priority radio system 23 during the next limitation period, as described above with reference to FIGS. 2 and 3. The arbiter 40 then sets the upper bound on the transmit power of the lower priority radio system 33 (i.e. the radio system that is on hold), using for example Equation 1.

In this way, the highest priority radio system 23,33 is given priority over the other radio systems 23,33 by prioritizing the transmit power requirements of the high priority radio system 23,33 over the transmit power requirements of the low priority radio system 23,33.

Method 1 has been used, in this embodiment, in the case that the high priority radio system 23,33 is supporting a CS service. This method is preferable in this case because, typically, CS services are often used for voice calls and voice calls are often more important to a user than say a data connection which may be taking place in the background. Also, CS services typically do not vary faster than a certain rate and therefore a relatively reliable headroom can be estimated. PS services, on the other hand, are bursty, and it is thus typically more difficult to obtain a reliable estimate of the headroom required for that service. However, it will be understood that this example method can still be applied when the high priority radio system 23,33 is supporting a PS service if desired.

Figure 4:
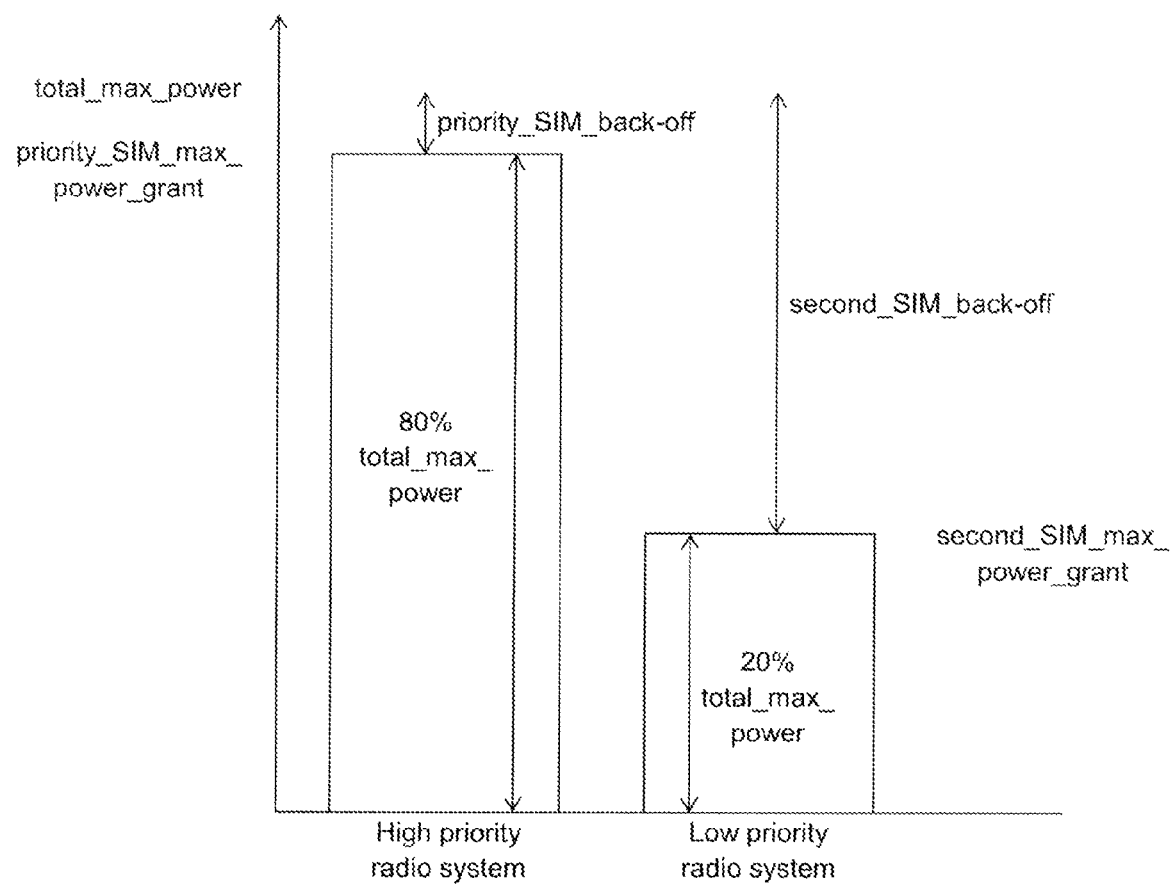
FIG. 4 shows graphically another example of how the upper bounds on the transmit powers of the radio systems may be set according to an embodiment of the present invention; and, FIG. 5 shows graphically another example of how the upper bounds on the transmit powers of the radio systems may be set according to an embodiment of the present invention.

FIG. 4 corresponds to method 2, which is used when both radio systems are supporting PS services with different priorities, and shows graphically an alternative method of determining the upper bounds on the transmit powers of the radio systems 23,33. In method 2, instead of setting the upper bounds on the transmit powers of the radio systems 23,33 in dependence upon the mean current power of the radio systems 23,33, the upper bounds are set as a percentage of the maximum permitted transmit power of the device 10. For example, in the event that one radio system 23,33 is determined to have a higher priority than the other radio system 23,33, the arbiter 40 sets the upper bound on the high priority radio system 23,33 equal to a predetermined percentage of the maximum permitted transmit power of the device 10. The arbiter assigns the low priority radio system 23,33 the remaining transmit power, such that the sum of the upper bounds on the transmit powers of the two radio systems 23,33 (in linear units) is equal to the maximum permitted transmit power of the device 10 (in linear units). In the particular example shown in FIG. 4, the high priority radio system is assigned 80% of the maximum permitted transmit power of the device 10 (total_max_power) and the lower priority radio system is assigned 20% of the maximum permitted transmit power of the device 10 (total_max_power), corresponding to a Primary_SIM_backoff of 1 dB of the total_max_power and a Second_SIM_backoff of 7 dB of the total_max_power, as shown schematically in FIG. 4. It will be understood that other splits of the available power may be used. The radio systems 23,33 are then caused to transmit at powers at or below their respective upper bounds.

As indicated in the table above, this method is applied when both radio systems 23,33 are supporting PS services and have different priorities. This method is preferred over method 1 when both services are PS services because data rates are bursty for PS services and thus the mean current powers of the radio systems 23,33 can vary widely during a particular limitation period. In some cases, therefore, the mean current power of the radio systems 23,33 might not be a very good indication of the transmit powers that the radio systems 23,33 will use during the next limitation period. It will be understood, however, that the use of this method is not restricted to the case that both radio systems 23,33 are supporting PS services and have different priorities. For example, this method could be used when both radio systems 23,33 have equal priority, in which case both radio systems 23,33 would be assigned 50% of the total_max_power (or in other words, would each have a back-off of 3 dB from the total_max_power of the device 10). As another example, this method may be used when one or more of the radio systems 23,33 is supporting CS services if it is found to be preferable over method 1

Figure 5:
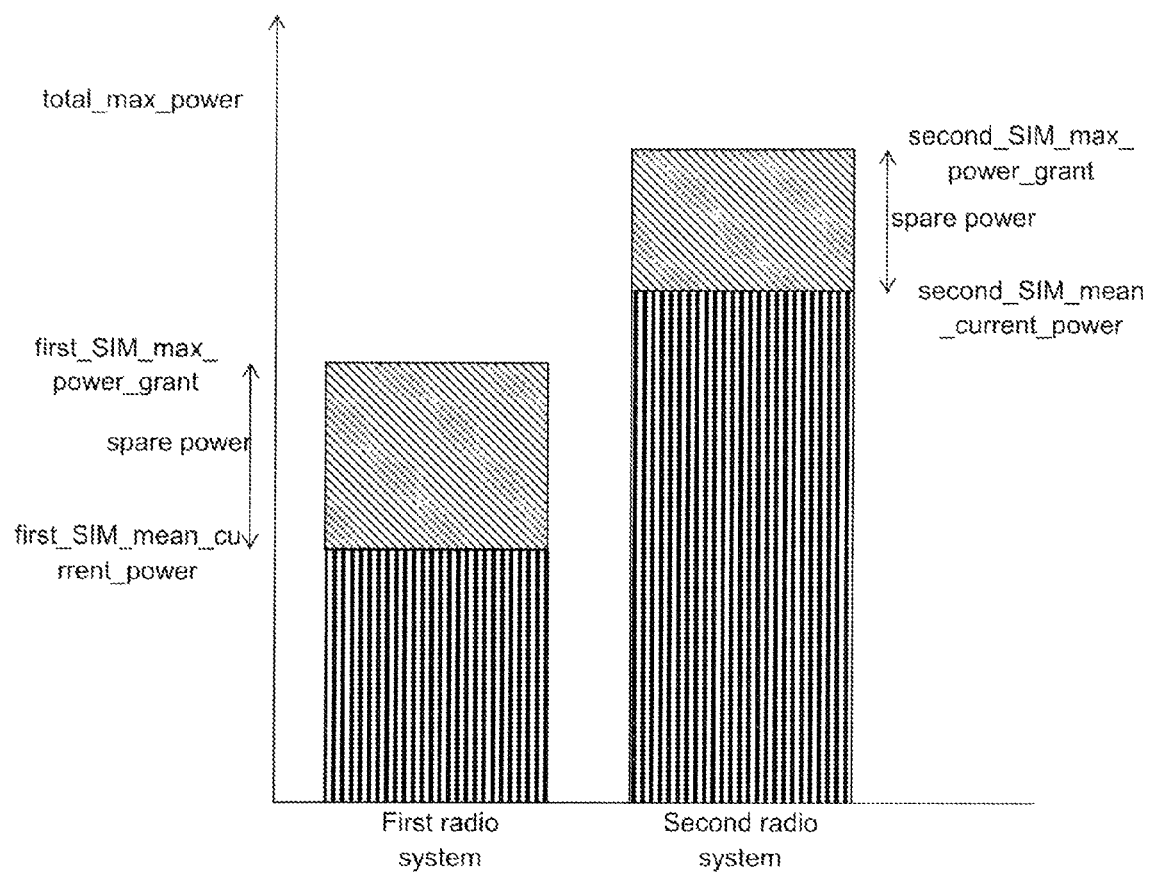

FIG. 5 corresponds to method 3, which is used when both radio systems 23,33 have the same priorities. In this case, although the mean current transmit powers of the radio systems 23,33 may be unreliable as estimates of the transmit powers that the radio systems 23,33 may need to use during the next limitation period, it may be that setting the upper bounds on the transmit powers of the radio systems 23,33 in dependence upon the mean current transmit powers of the radio systems 23,33 is found to be a more efficient way of dividing the total allowed transmit power between the radio systems 23,33 than, for example, method 2. In method 3 therefore, the SIMS 21,31 communicate the mean current transmit powers of the radio systems 23,33 (first_SIM_mean_ current_power, second_SIM_mean_current_power) to the arbiter 40, as in method 1, and the arbiter 40 is then configured to determine the "spare" power, which is defined as total_ max_power_lin−(first_SIM_mean_current_power_lin+second_SIM_mean_current_power_lin) in linear power units (i.e. milliWatts) or 10 log(total_max_power_lin−(first_SIM_ mean_current_power_lin+second_SIM_mean_current_ power_lin)) in dB relative to the total_max_power. The arbiter 40 is then configured to set the upper bounds on the transmit powers of each of the radio systems 23,33 to be the mean current power for that respective radio system 23,33 (first_SIM_mean_current_power, second_SIM_mean_current_power) increased by the spare power in dB relative to the mean current power of that radio system. As a particular example, if the device 10 is currently transmitting at half its total_max_power, then the spare power is 3 dB relative to the total_max_power. In this case, the upper bound on the transmit power of the first radio system (first_SIM_max_power_grant) 23,33 is set to be the first_SIM_mean_current_power increased by 3 dB and similarly, the upper bound on the transmit power of the second radio system (second_SIM_max_power_grant) 23,33 is set to be the second_SIM_mean_current_power increased by 3 dB. In other words, in this particular example, the upper bounds on the transmit powers of the radio systems 23,33 are set to be double their respective mean current powers.

In the case that there is no spare power (i.e. if the sum of the mean current powers of both radio systems 23,33 (in linear units) is equal to the total max power (in linear units)), then both radio systems 23,33 are assigned upper bounds equal to their mean current transmit power.

In general, the mean current transmit powers of the radio systems 23,33 gives the arbiter 40 an indication of the transmit powers that the radio systems may need during the next limitation period, and therefore allows the arbiter 40 to increase the quality of service provided by the device 10 by dividing the available transmit power between the radio systems with less "wastage" of transmit power. For example, if the mean current transmit power of the high priority radio system is relatively low compared to the maximum permitted transmit power of the device 10, then knowing the mean current transmit power of the high priority radio system 23,33 will prevent the arbiter 40 from setting an unnecessarily high upper bound on the transmit power of the high priority radio system 23,33, when it is likely that that radio system will actually only need a relatively low transmit power during the next limitation period. This "frees up" transmit power, which can be used by the low priority radio system 23,33 and increases the likelihood that both radio systems 23,33 will be able to provide a good quality of service (rather than just the high priority radio system 23,33 being able to provide a good quality of service).

The mean current transmit power of a radio system 22,23 may also be used by the arbiter 40 to determine whether the upper bound on the transmit power for that radio system 23,33 was set too low in a previous limitation period. This would be indicated, for example, by the mean current transmit power for a radio system 22,23 being higher than the upper bound on the transmit power of that radio system 23,33.

In each of the above examples, it was assumed that both radio systems 23,33 are active. However, it may be that one or more of the radio systems 23,33 is inactive and not supporting a service. In this case, the inactive radio system(s) 23,33 will require little or no transmit power. If a radio system 23,33 is inactive, the radio system will indicate this to the arbiter 40 and the arbiter 40 will determine that the inactive radio system is of lower priority than all radio systems 23,33 that are supporting active services. In this case, in one example, the arbiter 40 will not allocate the inactive radio system 23,33 any transmit power and its upper bound will be set to 0 mW. If the inactive radio system 23,33 then becomes active while its upper bound is set at 0 mW, then that radio system 23,33 (or the SIM 21,31 of that radio system 23,33) may request a power grant from the arbiter 40, which will trigger the arbiter 40 to reassess the upper bounds on the transmit powers of the radio systems 23,33 and set new upper bounds.

As mentioned above, in each of these examples, once the upper bounds on the transmit powers of the radio systems 23,33 have been set by the arbiter 40, they are then indicated (either directly or via the SIMs 21,31) to the radio systems 23,33 and the radio systems 23,33 are caused to transmit with transmit powers at or below their respective upper bounds for a limitation period $T_{lim}$. Once the limitation period has expired, the arbiter 40 is configured to re-determine the upper bounds on the transmit powers of the radio systems 23,33, depending on the current connection parameters relating to the connections being provided by the radio systems 23,33 at that time. Depending on the embodiment, this may involve the SIMs 21,31 triggering the arbiter 40 to reassess the upper bounds by indicating criteria (such as the types of services currently supported by the radio systems 23,33. i.e. CS or PS, RT or NRT, quality of service parameters, etc.) to the arbiter 40, and/or other factors such as a user-specified preference as to which SIM 21,31 is to take priority, whether a call is an emergency call, etc., which enable the arbiter 40 to determine the priorities of the radio systems 23,33. The SIMs 21,31 may optionally also indicate the mean current transmit powers of the radio systems 23,33, so that a more accurate determination of the upper bounds on the transmit powers of the radio systems 23,33 can be determined, as discussed above. In an alternative example, the arbiter 40 uses a timer to monitor the time and to determine when it needs to reassess the upper bounds on the transmit powers.

It will also be understood that in each of the above examples, in which the priorities of the radio systems are determined in dependence upon whether the radio systems are supporting CS services or PS services, and whether the services are RT or NRT, the arbiter 40 may also determine the priorities in dependence upon other factors. Alternatively, the above methods may also be used when the arbiter 40 determines the priorities of the radio systems 23,33 solely in dependence upon those other factors. Such other factors may include for example: the pre-defined priorities of the radio systems 23,33, the predefined priorities of the SIMs 21,31 for which the radio systems 23,33 are providing service (these priorities may be pre-specified by the user of the device, for example, a user may have a SIM for work calls and a SIM for personal calls, and the user may specify to the arbiter 40 that the work SIM is higher priority); the quality of service requirements of the services currently being supported by the radio systems 23,33 (some NRT services may have higher quality of service requirements than others); and the priorities of the services currently being supported by the radio systems 23,33 (services such as calls to the emergency services may be given the highest priority).

As a particular example, it may be that the device 10 is able to support two active CS services (i.e. not on hold) simultaneously. In this case, the SIMs 21,31 may be configured to indicate the user-defined priorities of the radio systems 23,33/SIMs 21,31 to the arbiter 40, and the arbiter 40 may be configured to set the upper bounds on the transmit powers of the radio systems 23,33 in dependence on the user-defined priorities and the current optimum transmit power of the radio systems. For example, it may be that the spare power is shared between the radio systems 23,33 as described above with reference to FIG. 5. Alternatively, it may be that a headroom and a back-off are determined for the high priority radio system and the upper bounds on the transmit powers of the radio systems 23,33 may be set in dependence upon these values as described above with reference to FIG. 2 and FIG. 3. Additionally, as suggested above, it may be that the user-defined priority of a voice call may be taken into account by the arbiter 40 when determining the priorities of the radio systems 23,33. For example, calls to/from the user's office and calls to the emergency services may be prioritized highly.

As mentioned above, it may be that the maximum permitted transmit power of the device 10 is variable over time. In this case, before setting the upper bounds on the transmit powers of the radio systems 23,33, the arbiter 40 may determine the current maximum permitted transmit power and may fix the maximum transmit power of the device 10 (total_max_power) to that current maximum permitted transmit power for the whole of the next limitation period. The arbiter 40 may then use any of the methods as outlined above to set the upper bounds on the transmit powers of the radio systems 23,33.

As a particular example, it could be that the average total transmit power of the device 10 over a pre-specified period of time ($T_{ave}$) cannot exceed a certain limit ($P_{ave}$). This limit $P_{ave}$ may be predetermined, for example by the legal limits on the specific absorption rate (SAR) of the device 10 (which is typically assessed as the average rate of absorption of RF energy per kg of the body over a number of seconds). Alternatively, or additionally, it could be predetermined by the maximum average thermal heating that the device can withstand over a period of time. In this case, it is possible, within some time period $T_{ave}$, to allow the total transmit power of the device 10 to exceed $P_{ave}$ for a length of time T that is shorter than $T_{ave}$ without exceeding $P_{ave}$ over that whole period $T_{ave}$. In other words, the total transmit power of the device can exceed $P_{ave}$ for a short amount of time, as long as this is compensated for by subsequently limiting the total transmit power of the device to a power that is less than $P_{ave}$, or indeed by the total transmit power of the device having been less previously. Allowing the total transmit power of the device 10 to exceed $P_{ave}$ for short amounts of time may be advantageous for example if one or more of the radio systems 23,33 of the device 10 is supporting PS services, which are bursty, and therefore need high transmit powers for short lengths of time.

According to one embodiment, therefore, the arbiter 40 may monitor the total transmit power of the device 10. At the beginning of each limitation period, it may then determine the maximum permitted transmit power (total_max_power) of the device 10 for the next limitation period in dependence on $P_{ave}$ and the average transmit power the device 10 has used since the time $T-(T_{ave}-T_{lim})$, where T is the current time. In other words, the arbiter 40 determines total_max_power for a particular limitation period such that the maximum average transmit power $P_{ave}$ of the device 10 is not exceeded over any period of time $T_{ave}$. The arbiter 40 then determines the upper bounds on the transmit powers of the radio systems in dependence upon total_max_power for that particular limitation period according to any of the methods as described above. This is repeated after each limitation period and, in this way, total_max_power is periodically adjusted by the arbiter 40 after each limitation period to reflect the recent transmit power of the device. This typically allows the radio system 23,33 to use transmit powers that are higher than $P_{ave}$ when they are needed and thus improves to quality of service provided by the radio systems 23,33, particularly when those radio systems are supporting PS services. In this example, $P_{ave}$ and $T_{ave}$ are predetermined, and may be stored in a memory of the device 10.

In the case that the maximum permitted transmit power of the device 10 in any limitation period is determined by the maximum thermal heating that the device 10 can safely withstand, it may be that $P_{ave}$ is unknown, or alternatively it may not be a fixed value (i.e. it may depend on the ambient temperature). In this case, instead of, or in addition to, monitoring the total transmit power of the device 10, the arbiter 40 may monitor the temperature of the device 10 and may determine the maximum permitted transmit power for a particular limitation period total_max_power in dependence upon the current temperature of the device, or the average temperature of the device over a period immediately preceding the limitation period for which the maximum total transmit power (total_max_power) is being determined. For example, if the current temperature of the device 10 is at or close to the maximum temperature, then the arbiter 40 may determine to set a lower maximum permitted transmit power of the device 10 for the next limitation period than was used in the previous limitation period. Alternatively or additionally, the arbiter 40 may monitor the peak current drawn from a battery of the device 10 over a particular limitation period, and may set the maximum permitted transmit power such that the maximum electrical current that can be drawn from the battery of the device 10 cannot be exceeded.

In addition to the temperature of the device 10, as discussed above, the total transmit power of a device 10 can also affect other things, such as the rate of power consumption. In one embodiment, therefore, the arbiter 40 may alternatively or additionally set the upper bounds on the transmit powers of the radio systems 23,33 in dependence upon one or more of these factors. As a particular example, the maximum permitted transmit power (total_max_power) of the device 10 for a particular limitation period may be determined by the arbiter 40 at the start of that limitation period in dependence upon the current state of the power source of the device, such as the current level of charge of a battery of the wireless device.

Although the above embodiments have been described with reference to a device 10 that has just two SIMS 21,31 and just two radio systems 23,33, it will be understood that the above embodiments apply to any device that has a plurality of SIMs 21,31 and radio systems 23,33, i.e. more than two SIMs 21,31 and more than two radio systems 23,33.

The above embodiments are to be understood as illustrative examples of the invention. Further embodiments of the invention are envisaged. For example, the priorities of the radio systems 23,33 may be determined in dependence upon the order in which the current connections supported by the radio systems 23,33 were first initiated on those radio systems 23,33. For example, if two radio systems 23,33 are each supporting a connection, but the first radio system 23 began its connection before the second radio system 33, then the connection on the first radio system 23 may be prioritized (thereby prioritizing that first radio system 23). As another example, a user may be able to specify that they would like to prioritize battery life over the quality service of the lowest priority radio system 33. As a further example, it may be that alternatively or in addition to the factors outlined above, the upper bounds on the transmit powers of the radios systems 23,33 may be determined in dependence upon the current radio conditions.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of limiting a total transmit power of a wireless device having a plurality of radio systems that each provide service for a different SIM of the wireless device, the method comprising:
   determining a current priority of each of the plurality of radio systems that provide service for the different SIMs;
   setting an upper bound for transmit power of each of the plurality of radio systems in dependence on at least the current priorities of the plurality of radio systems and a current maximum permitted transmit power of the wireless device, the upper bounds for the transmit power of each of the plurality of radio systems being variable over time and being set such that a sum of the upper bounds does not exceed the current maximum permitted transmit power of the wireless device, the total transmit power of the wireless device at any time being a sum of the transmit powers of the plurality of radio systems at that time; and,
   for each of the plurality of radio systems, limiting the transmit power of that radio system such that the respective upper bound for the transmit power for that radio system is not exceeded.

2. The method according to claim 1, wherein the transmit power of each of the plurality of radio systems is limited to its respective upper bound for a predetermined limitation period, and after the predetermined limitation period has passed, the method comprises:
   determining a new current priority of each of the plurality of radio systems;
   setting a new upper bound for the transmit power of each of the plurality of radio systems in dependence on the new current priorities of the plurality of radio systems and the current maximum permitted transmit power of the wireless device; and,
   for each of the plurality of radio systems, limiting the transmit power of that radio system for the predetermined limitation period, such that the determined new upper bound for the transmit power for that radio system is not exceeded within that predetermined limitation period.

3. The method according to claim 2, wherein an average transmit power of the wireless device, averaged over a predetermined period of time, cannot exceed a predetermined power, and the method comprises determining the current maximum permitted transmit power of the wireless device at the start of each limitation period in dependence upon said predetermined power and the previous transmit power of the wireless device.

4. The method according to claim 1, wherein the current maximum permitted transmit power of the wireless device is fixed and cannot exceed a predetermined power at any time.

5. The method according to claim 1, wherein the priority of each of the plurality of radio systems is determined according to at least one of:
   whether the radio system is supporting circuit switched or packet switched services;
   whether the radio system is supporting real-time or non-real-time services;
   a pre-defined priority of the SIM for which the radio system provides service;
   quality of service requirements of the service supported by the radio system; and
   the priority of the service supported by the radio system.

6. The method according to claim 1, wherein a radio system providing a circuit switched service is determined to have a higher priority than a radio system providing a packet switched service.

7. The method according to claim 1, wherein a radio system providing a real-time service is determined to have higher priority than a radio system providing a non-real-time service.

8. The method according to claim 1, wherein, in the event that a first radio system is determined to have a higher priority than a second radio system, then the upper bound on the transmit power of the first radio system is set to be higher than the upper bound on the transmit power of the second radio system.

9. The method according to claim 1, wherein the setting of the upper bounds on the transmit powers of the plurality of radio systems is also dependent upon the mean current powers of each of the plurality of radio systems, the mean current power of a radio system being the average transmit power used by that radio system over a period of time immediately preceding the current time.

10. The method according to claim 9, wherein, in the event that it is determined that one of the plurality of radio systems has the highest priority, the upper bound on the transmit power of that radio system is set to be the lowest value out of:
(i) the current maximum permitted transmit power of the wireless device less a predetermined minimum back-off, and
(ii) the sum of the mean current power of that radio system and a headroom, wherein the headroom is determined according to a predicted power variation of that radio system over the period of time for which the upper bound will be applied.

11. The method according to claim 1, wherein the current maximum permitted transmit power is determined in dependence upon at least one of:
a current temperature of the device;
a maximum electrical current that can be drawn from a battery of the wireless device;
legal limitations on the transmit power of the wireless device; and
a current status of a battery of the wireless device.

12. An apparatus for limiting a total transmit power of a wireless device, the apparatus comprising at least one processor, and at least one memory including computer program code, the at least one memory and the computer program code being configured to, with the at least one processor, cause the apparatus at least to:
determine a current priority of each of a plurality of radio systems of the wireless device, each of the plurality of radio systems providing service for a different SIM of the wireless device;
set an upper bound for transmit power of each of the plurality of radio systems in dependence on at least the current priorities of the plurality of radio systems and a current maximum permitted transmit power of the wireless device, the upper bounds for the transmit power of each of the plurality of radio systems being variable over time and being set such that a sum of the upper bounds does not exceed the current maximum permitted transmit power of the wireless device, the total transmit power of the wireless device at any time being a sum of the transmit powers of the plurality of radio systems at that time; and,
for each of the plurality of radio systems, limit the transmit power of that radio system such that the respective upper bound for the transmit power for that radio system is not exceeded.

13. The apparatus according to claim 12, wherein the transmit power of each of the plurality of radio systems is limited to its respective upper bound for a predetermined limitation period, and the apparatus is arranged to, after the predetermined limitation period has passed:
determine a new current priority of each of the plurality of radio systems;
set a new upper bound for the transmit power of each of the plurality of radio systems in dependence on the new current priorities of the plurality of radio systems and the current maximum permitted transmit power of the wireless device; and,
for each of the plurality of radio systems, limit the transmit power of that radio system for the predetermined limitation period, such that the determined new upper bound for the transmit power for that radio system is not exceeded within that predetermined limitation period.

14. The apparatus according to claim 13, wherein an average transmit power of the wireless device, averaged over a predetermined period of time, cannot exceed a predetermined power, and the apparatus is arranged to determine the current maximum permitted transmit power of the wireless device at the start of each limitation period in dependence upon said predetermined power and the previous transmit power of the wireless device.

15. The apparatus according to claim 12, wherein the current maximum permitted transmit power of the wireless device is fixed and cannot exceed a predetermined power at any time.

16. The apparatus according to claim 12, wherein the priority of each of the plurality of radio systems is determined according to at least one of:
whether the radio system is supporting circuit switched or packet switched services;
whether the radio system is supporting real-time or non-real-time services;
a pre-defined priority of the SIM for which the radio system provides service;
quality of service requirements of the service supported by the radio system; and
the priority of the service supported by the radio system.

17. The apparatus according to claim 12, wherein a radio system providing a circuit switched service is determined to have a higher priority than a radio system providing a packet switched service.

18. The apparatus according to claim 12, wherein a radio system providing a real-time service is determined to have higher priority than a radio system providing a non-real-time service.

19. The apparatus according to claim 12, wherein, in the event that a first radio system is determined to have a higher priority than a second radio system, then the upper bound on the transmit power of the first radio system is set to be higher than the upper bound on the transmit power of the second radio system.

20. The apparatus according to claim 12, wherein the setting of the upper bounds on the transmit powers of the plurality of radio systems is also dependent upon the mean current powers of each of the plurality radio systems, the mean current power of a radio system being the average transmit power used by that radio system over a period of time immediately preceding the current time.

21. The apparatus according to claim 20, wherein, in the event that it is determined that one of the plurality of radio systems has the highest priority, the upper bound on the transmit power of that radio system is set to be the lowest value out of:
(i) the current maximum permitted transmit power of the wireless device less a predetermined minimum back-off, and
(ii) the sum of the mean current power of that radio system and a headroom, wherein the headroom is determined according to a predicted power variation of that radio system over the period of time for which the upper bound will be applied.

22. The apparatus according to claim 12, wherein the current maximum permitted transmit power is determined in dependence upon at least one of:
a current temperature of the wireless device;
a maximum electrical current that can be drawn from a battery of the wireless device;
legal limitations on the transmit power of the wireless device; and
a current status of a battery of the wireless device.

23. A non-transitory computer-readable storage medium comprising a set of computer-readable instructions for limiting a total transmit power of a wireless device such that when the computer program is executed on a computing device of the wireless device having a plurality of radio systems that each provide service for a different SIM of the wireless device, the computing device is arranged to:
- determine a current priority of each of the plurality of radio systems that provide service for the different SIMs;
- set an upper bound for the transmit power of each of the plurality of radio systems in dependence on at least the current priorities of the plurality of radio systems and a current maximum permitted transmit power of the wireless device, the upper bounds for the transmit power of each of the plurality of radio systems being variable over time and being set such that a sum of the upper bounds does not exceed the current maximum permitted transmit power of the wireless device, the total transmit power of the wireless device at any time being a sum of the transmit powers of the plurality of radio systems at that time; and,
- for each of the plurality of radio systems, limit the transmit power of that radio system such that the respective upper bound for the transmit power for that radio system is not exceeded.

* * * * *